Patented Oct. 13, 1942

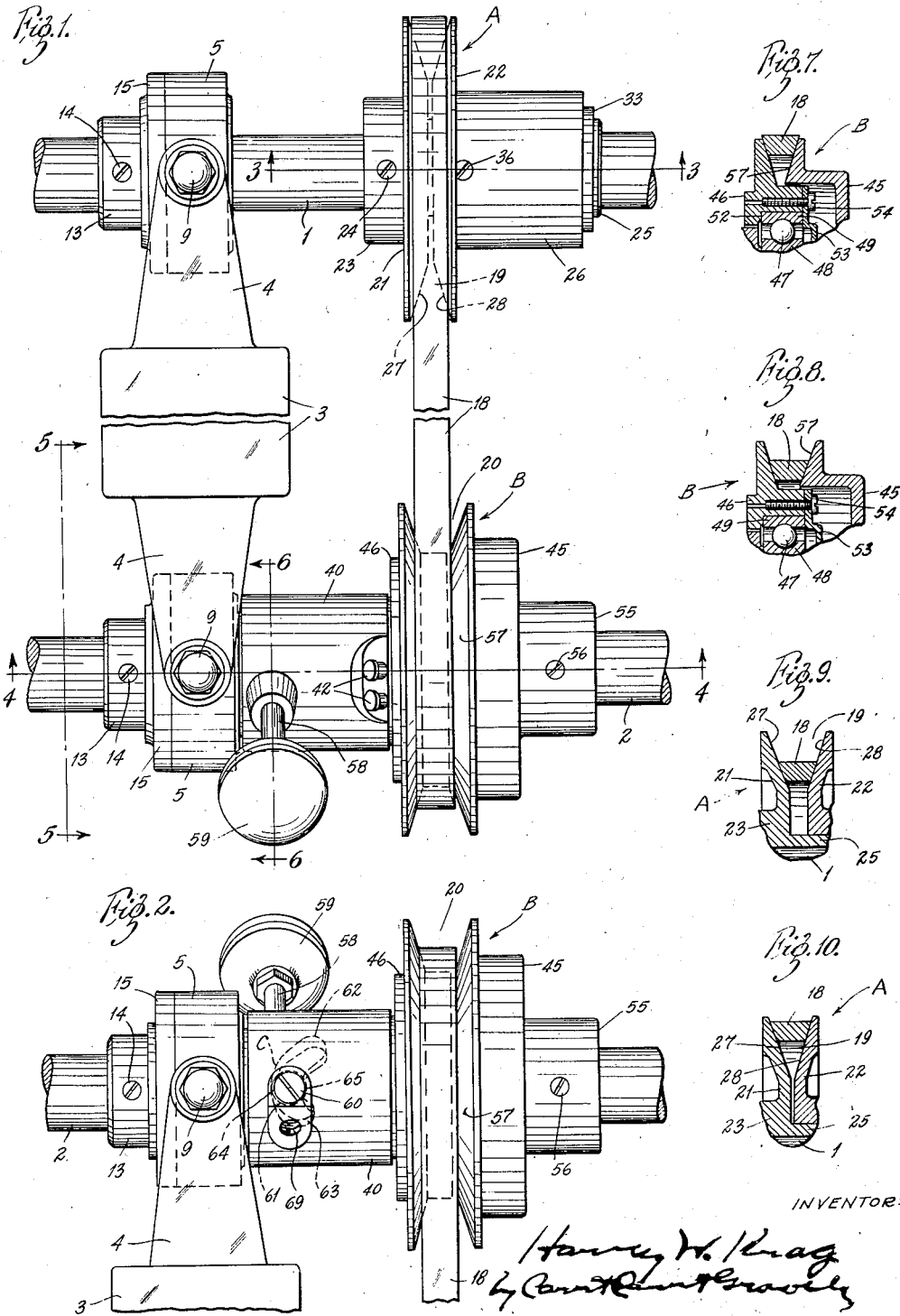

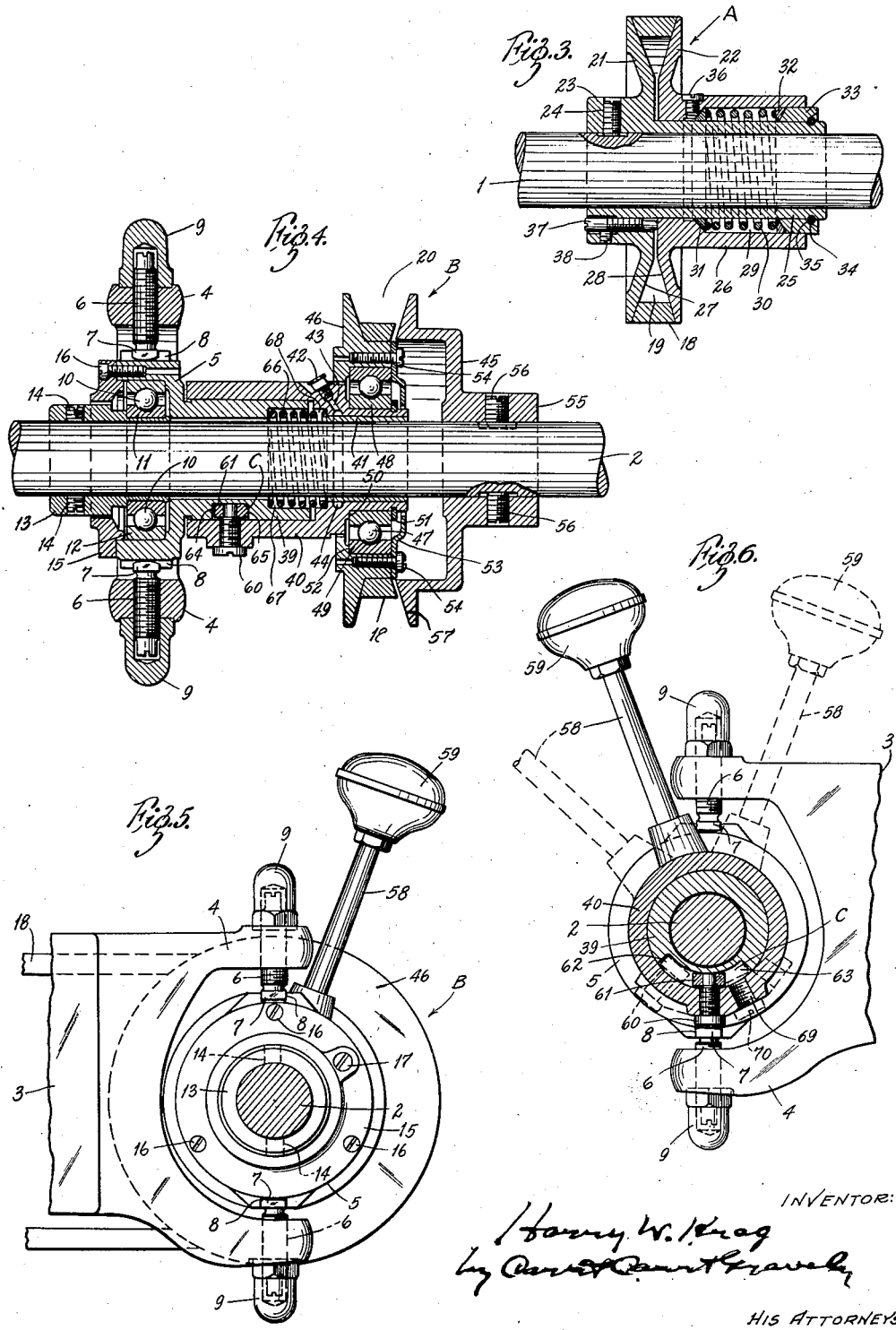

2,298,535

UNITED STATES PATENT OFFICE 2,298,535

DRIVE MECHANISM

Harry W. Krag, Vinita Park, Mo., assignor to American Shoe Machinery and Tool Company, St. Louis, Mo., a corporation of Missouri Application January 2, 1941, Serial No. 372,878

4 Claims. (Cl. 74—230.17)

This invention relates to drive mechanisms, particularly belt and pulley drive mechanisms in which means are provided for varying the speed relationship between the driving and driven shafts and for operatively connecting the endless power transmission belt to and disconnecting it from one of said shafts. The invention has for its principal object to provide a simple and efficient arrangement for changing the speed relationship between the driving and driven shafts of a drive mechanism of the above type and for readily connecting the driven pulley to and disconnecting it from the driven shaft, to provide for automatically increasing the tension of the belt when the driven pulley is connected to the driven shaft and for slackening said belt when said driven pulley is disconnected from said driven shaft and to provide for simplicity and cheapness of construction and compactness of design.

In the accompanying drawings, which form part of this specification and wherein like symbols refer to like parts wherever they occur:

Fig. 1 is a plan view of a change speed belt and pulley drive mechanism embodying my invention, the belt being shown in idling position, Fig. 2 is a bottom plan view of the driven shaft and parts associated therewith, Fig. 3 is a vertical longitudinal section through the drive mechanism, the section being taken along the drive shaft on the line 3—3 of Fig. 1, Fig. 4 is a vertical longitudinal section through the drive mechanism, the section being taken along the driven shaft on line 4—4 of Fig. 1, Figs. 5 and 6 are vertical transverse sections through the driven shaft on the lines 5—5 and 6—6, respectively, in Fig. 1, Fig. 7 is a fragmentary section through the rim portion of the driven pulley, showing the position of the belt therein in the low speed adjustment thereof, Fig. 8 is a similar section, showing the position of the belt in said driven pulley in the high speed adjustment thereof, Fig. 9 is a fragmentary section through the rim portion of the driving pulley, showing the position of the belt therein when the driven pulley is adjusted for low speed; and Fig. 10 is a similar section, showing the position taken by said belt in said driving pulley in the high speed adjustment of the driven pulley.

My change speed belt and pulley drive mechanism comprises spaced parallel horizontally disposed driving and driven shafts 1 and 2, respectively, and a suitably supported, horizontally disposed bracket 3 arranged crosswise of said shafts and having yoke-shaped end portions supporting the respective shafts. As shown in the drawings, the driving shaft 1 and driven shaft 2 are each journaled in a housing 5 supported in an adjacent yoke 4 of the supporting bracket 3. Each housing 5 is secured to its supporting yoke 4 by screws 6 that extend vertically through the respective branches of said yoke and have rectangular inner end portions 7 that seat in external longitudinal grooves 8 provided therefor in said housing. The screws 6 are locked in the desired position of vertical adjustment by means of cap nuts 9 that are threaded over the outer ends of said screws in endwise abutting relation to the respective branches of the yoke 4. By this arrangement, each housing 5 and the shaft journaled therein may be adjusted vertically in its supporting yoke 4 by manipulating the screws 6 and also longitudinally of said shaft when said screws are loosened.

Enclosed in each of the housings 5 is a bearing which preferably comprises a circular series of balls 10 interposed between an inner raceway member 11 and an outer raceway member 12. The inner raceway member 11 of said bearing is pressfitted on an adapter sleeve 13 that is rigidly secured to the shaft journaled in said bearing by one or more set screws 14; and the outer raceway member 12 of said bearing seats in the housing 5 therefor. The bearing and adapter sleeve 13 for each of the housings are inserted in and removed from the housing 5 therefor through an opening in one end of said housing, which opening is closed by an annular closure member 15 that is removably secured to said housing by cap screws 16. Oil is supplied to the interior of each of the bearing housings 5 through a filler hole closed by a threaded plug or screw 17.

The driving shaft 1 has a driving pulley A thereon and the driven shaft has a driven pulley B thereon; and each of said pulleys is located adjacent to and on the same side of the supporting bracket 3. Power is transmitted from the driving pulley A to the driven pulley B through a power transmission band in the form of an endless flexible belt 18. As shown in the drawings, the driving belt 18 is V-shaped in transverse cross-section and operates in a V-groove 19 in the driving pulley A and in a V-groove 20 in the driven pulley B.

The driving pulley A comprises two end sections, a fast or driving section 21 and a loose or driven section 22. The pulley section 21 has a hub 23 at the outer end thereof that is mounted on the driving shaft 1 and rigidly secured thereto by means of one or more set screws 24. The pulley section 21 also has a relatively long hub portion 25 projecting from the opposite end thereof; and the other pulley section 22 has a similar hub 26 at the outer end thereof that is mounted on the long hub 25 of the pulley section 21 for rotary and axial movement relative thereto. The driving pulley sections 21 and 22 have opposed disk-like portions or flanges 27 and 28, respectively, that are shaped to form the V-groove 19 in the driving pulley A.

The hub 26 of the loose pulley section 22 is counterbored, as at 29 to receive a coil compression spring 30, which is sleeved on the long hub 25 of the fast pulley section 21 with its inner end seating against a split ring 31 that surrounds said long hub at the inner end of said counterbore and a similar split ring 32 that surrounds said long hub adjacent to the outer end of said counterbore. The innermost ring or spring seat 30 has a conical inner end face that is held by the spring 29 against a conical seat provided therefor at the inner end of the counterbore 29; and the outermost ring 32 has a conical outer end portion that seats against the conical inner end portion of a sleeve or collar 33 that is sleeved on the outer end of the long hub 25 of the pulley section 21 and closes the outer end of the spring receiving counterbore 29 in the hub 26 of the pulley section 22. Outward movement of the sleeve 33 in the counterbore 29 is prevented by means of a snap ring 34 that seats in an external annular groove provided therefor in the long hub 25 of the pulley section 21 and an internal annular recess 35 in the outer end of the bore in said sleeve. The spring 30 forces the split conical rings 31 and 32 endwise against the conical seats provided therefor in the hub of the driving pulley A, thereby closing in the ring 31 on the hub 25 of the driving section 21 of said pulley and expanding the ring 32 against the hub 26 of the loose pulley section 22 and thus clutching the two sections together and preventing any radial play therebetween which might cause said pulley to knock or rattle. Lubricant is supplied to the cooperating surfaces of the hub portions of the respective pulley sections through a hole that extends radially through the hub 26 of the section 22 and is closed by means of a screw plug 36.

The endless driving belt 18 runs in the V-groove of the driving pulley A and is driven by the fast or driving section 21 thereof due to the spring pressed loose pulley section 22 which presses against one side face of said belt and presses the other side face thereof against the fast pulley section and is thus forced to rotate therewith. The tension of the belt 18 is automatically regulated by the pressure of the spring 30 which tends to force the loose section 22 of the driving pulley A axially of the driving shaft 1 in the direction of the pulley section 21 fixed to said shaft. This endwise pressure of the spring 30 on the loose pulley section 22 of the driving pulley A is sufficient to prevent the two sections of the driving pulley A from being forced apart axially by the spreading action of the belt 18 when the latter is transmitting power through the driven pulley B to the driven shaft 2. To relieve the belt tension when the driven pulley B is running idle on the driven shaft 2 without transmitting power thereto, the movement of the loose section 22 of the driving pulley A towards the fast section 21 thereof is limited by adjustable stop screws 37, which are threaded lengthwise through the hub 23 of the pulley section 21 with their inner ends disposed in endwise abutting relation to the disk portion 28 of the pulley section 22. The stop screws 37 are locked in the desired position of adjustment by means of set screws 38 that are threaded through radial holes provided therefor in the hub 23 of the driving pulley section 21 with their inner ends bearing against the sides of said screws.

The housing 5, which contains the bearing for the driven shaft 2, has an extended hub portion 39 on its pulley opposing end upon which is supported a rotary and axially slidable sleeve 40. The sleeve 40 extends beyond the outer end of the supporting hub 39 therefor where it is supported on the driven shaft 2 by means of a suitable oil impregnated bushing 41 located in said sleeve beyond said end of said hub. The sleeve 40 is provided with two oil cups 42 that communicate through passageways 43 in said sleeve with an annular oil groove 44 therein. This oil groove surrounds the inner end of the bushing 41 and is supplied with oil from one of the oil cups 42, the other cup serving as a vent for the first mentioned cup. The driven pulley comprises two end sections, a wast or driving section 45 and a loose or idler section 46, the outer portions of the opposing end faces of said sections being shaped to form the peripheral V-groove 20 in said driven pulley. The idler section 46 of the driven pulley B is mounted on the sleeve 40 for axial movement therewith and rotary movement relative thereto by means of antifriction bearing preferably comprising a series of balls 47 interposed between an inner raceway member 48 and an outer raceway member 49. The inner raceway member 48 is mounted on the outer end portion of the sleeve 40 between an external annular shoulder 50 thereon and a snap ring 51 seated in an external annular groove therein. The outer raceway member 49 seats in the central opening of the annular idler section 46 of the driven pulley and is retained therein between an annular shoulder 52 in said opening and an annular closure and retaining plate 53 that is secured to said pulley section by means of screws 54. The idler section 46 of the driven pulley B forms the bottom and one inclined side wall of the V-groove 20 in said pulley. The other or driving section 45 of the driven pulley B has a hub portion 55, which is secured to the driven shaft 2 for rotation therewith by means of set screws 56, and an outstanding circumferential flange 57 that forms the other inclined side wall of the V-groove of said pulley.

The idler or loose section 46 of the driven pulley B is adjusted axially relative to the driving or fast section 45 thereof by sliding the supporting sleeve 40 for said first mentioned driven pulley section axially on the hub or tubular extension 39 of the fixed bearing supporting housing 5 for the driven shaft 2. In the position of axial adjustment of the sleeve 40, as shown in Fig. 4, the power transmission belt 18 seats against the bottom and one side wall of the V-groove forming portion of the idler pulley section 46 and is entirely clear of the portion of the driving section that forms the other side wall of said groove, whereby the belt rotates said idler section without imparting any rotary movement to the driven shaft 2 through said driving section. When the idler pulley section 46 is shifted axially from the idle position shown in Fig. 4 to the positions shown in Figs. 7 and 8, the belt carried by the idler section is pressed against the beveled end face 57 of the fast pulley section 45, which is driven by the friction between said end face and the inclined side driving surface of said belt. In the position shown in Fig. 7, the V-groove 20 formed by the two sections of the driven pulley B is of minimum width and the belt is crowded radially outwardly in said groove to cause the inclined side driving surfaces of the belt to engage the side walls of said groove at a maximum distance from the axis of said pulley, whereby said pulley is rotated at a relatively low speed. In the position shown in Fig. 8, the belt groove 20 formed by the idler and driving sections of the driven pulley is slightly wider than the groove shown in Fig. 7, whereby the side driving surfaces of the belt engage the inclined side walls of the groove closer to the axis of said pulley, thus causing the same to rotate at a relatively high rate of speed.

The supporting sleeve 40 for the idler section 46 of the driven pulley B is rotated on the fixed supporting hub 39, to provide the idling and low and high speed adjustments shown in Figs. 4, 7 and 8, respectively, by means of a single lever 58 that is fixed to said sleeve, projects radially outwardly therefrom and terminates at its outer end in a knob 59. When the sleeve 40 is thus rotated, axial movement is imparted thereto through a connection between said sleeve and the fixed supporting hub 39 therefor. As shown in the drawings, this connection preferably comprises a threaded stud or screw 60 that is threaded through a radial hole provided therefor in the cylindrical wall of the sleeve 40 and has a reduced inner end portion on which is rotatably supported a cam roller 61. This cam roller works in an external peripheral cam groove C provided therefor in the cylindrical sleeve supporting surface of the hub 39 of the fixed housing 5 for the driven shaft 2. As shown in Fig. 2, the cam groove C in the sleeve 40 has end portions 62 and 63 that extend in the direction of the driven pulley B and at reverse or diverging oblique angles to the axis of said sleeve, one of these end portions 62 being longer than the other end portion 63. The intermediate portion 64 of the cam groove C is disposed at right angles to the axis of the sleeve 40; and the side of said intermediate portion of said groove nearest the driven pulley B has a concave recess 65 therein adapted to provide a seat for the cam roller 61 when the latter is disposed in this intermediate portion of the groove. The roller is releasably held in the seat 65 of the cam groove C or at the end of either of the oblique end portions 62, 63 thereof by means of a coil compression spring 66 that is sleeved on the driven shaft 2 with its ends seated in opposed counterbores 67 and 68 in the hub 39 and sleeve 40, respectively. When the sleeve 40 is rotated by means of the lever 58 in a direction that will cause the cam roller 61 carried by said sleeve to move into the relatively long obliquely disposed end portion 62 of the cam groove in the fixed hub 39 and thus shift said sleeve and the idler pulley section 46 journaled therein axially in the direction of the fast pulley section 45 far enough to shift the driving belt 18 into the low speed position shown in Fig. 7. In this low speed adjustment of the driven pulley B, the belt 18 is running on the maximum effective diameter thereof and is thus drawn tight enough around the driving pulley A to spread apart the sections 21 and 22 thereof and run on the minimum effective diameter thereof, as shown in Fig. 9.

When high speed is desired, the lever 58 is swung in the opposite direction and the cam roller 61 engages the short oblique end portion 63 of the cam groove C, thus shifting the belt 18 into the high speed position shown in Fig. 8. In this high speed position of the belt in the driven pulley B, the belt is running on the minimum effective diameter thereof and on the maximum effective diameter of the driving pulley A whose sections are forced together by the pressure of the spring 30 to take up the slack in said belt. In the idle position of the driven pulley B, the cam roller 61 engages the intermediate portion 64 of the cam groove C moves the idler section 46 of said pulley and the belt running thereon clear of the fast section thereof, whereby said idler section rotates on the sleeve 40 without imparting any rotary movement to said fast section. In this idle position of the driven pulley B, the slack of the belt 18 is taken up by the self-adjusting driving pulley A, the stop screws 37 serving to prevent the loose section 22 of said driving pulley from moving far enough to prevent unnecessary tension on said belt.

By the arrangement described, the belt and pulley drive mechanism may be readily shifted into high and low speed positions and idle position by operating the single lever 58. The operating lever 58 is releasably held by the spring 66 in idle, high and low speed positions and is shifted in one direction for high speed and in the opposite direction for low speed. As shown in Fig. 6, the cam roller supporting screw 60 is located on the vertical transverse center line of the shaft in the idle position of the driven pulley B, thereby permitting the position of the pulley to be reversed end for end on the driven shaft 2 without changing the angular relation between said screw and the vertically disposed supporting screws 6 for the bearing supporting housing 5 for said driven shaft. As the lever 58 is disposed at an angle relative to the cam roller supporting screw 60, end for end reversal of the parts would reverse the angular position of said lever. To correct this position, so that the hand lever inclines forward in both positions of the end for end reversal of the parts, the sleeve 40 has a threaded hole 69 adapted to receive the screw 60. When the screw 60 is engaged with the hole 69, the operating lever will incline forward when the sleeve 40 is turned end for end. As shown in Fig. 6, this second screw hole 69 when not in use is closed by means of a cap screw 70.

Obviously, the hereinbefore described change speed belt and pulley driving mechanism admits of considerable modification without departing from the invention. Therefore, I do not wish to be limited to the precise construction shown and described.

What I claim is:

1. A drive mechanism comprising laterally spaced shafts, V-groove pulleys on the respective shafts, an endless power transmission V-belt encircling both of said pulleys and operating in the V-grooves thereof, one of said pulleys comprising two sections cooperating to form the V-groove therein, one of said sections being rigidly secured to its supporting shaft and the other of said sections being movable axially relative to said first mentioned section to connect and disconnect said pulley from said shaft and to vary the width of the V-groove in said pulley and thereby change the effective diameter thereof, the other of said pulleys comprising two sections that cooperate to form the V-groove therein, one of said sections being fixed to its supporting shaft and the other being automatically slidable axially thereof to increase the width of the V-groove in said other pulley when the width of the V-groove in said first mentioned pulley is decreased and for increasing the width of the V-groove in said other pulley when the width of the V-groove in said first mentioned pulley is decreased, adjustable means on said other pulley for limiting the movement of the axially sliding section thereof towards the section thereof fixed to the shaft and thereby prevent unnecessary tension on said belt when said first mentioned pulley is disconnected from its supporting shaft, and a lever operatively connected to said axially slidable section of said first mentioned pulley to actuate the same.

2. A driving mechanism comprising laterally spaced shafts, V-groove pulleys on the respective shafts, an endless power transmission V-belt encircling both of said pulleys and operating in the V-grooves thereof, each of said pulleys comprising sections cooperating to form the V-groove therein, one of the sections of each pulley being rigidly secured to its supporting shaft and the other of said sections being slidable axially of said shaft towards and away from the first mentioned section to vary the effective diameter thereof, a fixed sleeve surrounding one of said shafts adjacent to the axially slidable section of the pulley thereon, an operating sleeve slidably and rotatably mounted on said fixed sleeve and cooperating with said axially slidable pulley section to actuate the same, a lever fixed to said operating sleeve to rotate the same on said fixed sleeve, said fixed sleeve having a cam groove therein and said operating sleeve having a pin rigid therewith working in said cam groove, whereby said operating sleeve is slid axially of said fixed sleeve when rotated thereon by said lever, and a spring is mounted in the other of said pulleys for forcing the axially slidable section thereof in the direction of the fixed section thereof.

3. A drive mechanism comprising laterally spaced shafts, single V-groove pulleys on the respective shafts, a single endless power transmission V-belt encircling both of said pulleys and operating in the V-grooves thereof, one of said pulleys comprising a fast section adapted to form one side wall of the V-groove of said pulley and a loose axially slidable idler section adapted when slid in one direction to form the bottom and other side wall of said V-groove and to vary the width thereof to thereby change the effective diameter of said pulley, said idler section being adapted when slid in the opposite direction to support said belt entirely clear of said fast section, a spring for urging said idler section in said first mentioned direction, manually operable means for moving said idler section in said opposite direction, the other of said pulleys comprising a fast section forming one part of the V-groove of said other pulley, an axially slidable loose section forming the other part of the V-groove thereof and a spring for pressing said last mentioned loose section in the direction of said last mentioned fast section to thereby automatically vary the width of said last mentioned V-groove to increase the effective diameter of said other pulley when the effective diameter of said first mentioned pulley is decreased and to decrease the effective diameter of said other pulley when the effective diameter of said first mentioned pulley is increased, and means for relieving the pressure of the spring-pressed loose section of said other pulley on said belt when the loose section of said first mentioned pulley is in a position to support said belt entirely clear of the first section of said first mentioned pulley.

4. A drive mechanism comprising laterally spaced shafts, V-groove pulleys on the respective shafts, and endless power transmission V-belt encircling both of said pulleys and running in the V-grooves thereof, manually operable means for varying the width of the V-groove in one of said pulleys to thereby change the effective diameter thereof, the other of said pulleys comprising fast and loose sections cooperating to form the V-groove of said other section, said fast section having a hub portion and said loose section having a hub portion sleeved on and slidable axially of said hub of said fast section to thereby vary the width of the V-groove in said other pulley and thus change the effective diameter thereof, a coil spring interposed between the hubs of the sections of said other pulley and operating to press the loose section thereof in a direction which will narrow the V-groove in said other pulley, and means operated by the pressure of said spring to take up radial play between said hubs and to cause said hubs to rotate together.

HARRY W. KRAG.